US007986634B2

(12) United States Patent
Kang et al.

(10) Patent No.: US 7,986,634 B2
(45) Date of Patent: Jul. 26, 2011

(54) APPARATUS AND METHOD FOR MEASURING QUALITY OF SOUND ENCODED WITH A VARIABLE BAND MULTI-CODEC

(75) Inventors: Tae-Gyu Kang, Daejeon (KR); Ki-Jong Koo, Daejeon (KR); Dae-Ho Kim, Daejeon (KR); Do Young Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 952 days.

(21) Appl. No.: 11/857,539

(22) Filed: Sep. 19, 2007

(65) Prior Publication Data

US 2008/0103783 A1 May 1, 2008

(30) Foreign Application Priority Data

Oct. 27, 2006 (KR) ........................ 10-2006-0104789

(51) Int. Cl.
*H04L 12/26* (2006.01)

(52) U.S. Cl. ........ 370/252; 370/229; 370/241; 704/500; 704/E19.008; 709/224

(58) Field of Classification Search ........................ None
See application file for complete search history.

(56) References Cited

U.S. PATENT DOCUMENTS

| | | | | |
|---|---|---|---|---|
| 5,657,420 | A | 8/1997 | Jacobs et al. | |
| 7,002,992 | B1 * | 2/2006 | Shaffer et al. | 370/468 |
| 2001/0012368 | A1 * | 8/2001 | Yamazaki | 381/17 |
| 2004/0160979 | A1 * | 8/2004 | Pepin et al. | 370/462 |

FOREIGN PATENT DOCUMENTS

| | | |
|---|---|---|
| JP | 2002-064539 | 2/2002 |
| KR | 1020000025237 A | 5/2000 |
| KR | 1020030019839 A | 3/2003 |
| KR | 1020040060605 | 7/2004 |

OTHER PUBLICATIONS

Shulzrinne et al., RFC 3550, RTP: A Transport Protocol for Real-Time Applications, Jul. 2003, pp. 1-91.*

"Objective quality measurement of telephone-band (300-3400 Hz) speech codecs", International Telecommunication Union ITU-T Telecommunication Standardization Sector of ITU Recommendation p. 861, Aug. 1996, pp. 1-7.

J Rosenberg, et al; "An Offer/Answer Model with the Session Description Protocol (SDP);" *The Internet Society* (2002).

* cited by examiner

*Primary Examiner* — Ayaz R Sheikh
*Assistant Examiner* — Nicholas Sloms
(74) *Attorney, Agent, or Firm* — Ladas & Parry LLP

(57) ABSTRACT

Provided are a method and apparatus for measuring sound quality in a variable band multi-codec. The sound quality measurement apparatus includes: a recording file receiving/generating unit receiving a first recording file in which a natural sound is recorded, and a second recording file obtained by converting the natural sound into digital data using the variable band multi-codec, receiving information obtained by encoding the natural sound using the variable band multi-codec, in the format of a Real Time Protocol (RTP) packet, unpacking the RTP packet, decoding the RTP packet using the variable band multi-codec, and generating a third recording file; a Mean Opinion Score (MOS) value calculating unit repeatedly selecting a file from among the first recording file, the second recording file, and the third recording file, or selecting two files from among the first recording file, the second recording file, and the third recording file, and calculating a MOS value by obtaining a difference between the selected results; and a MOS value comparison unit comparing a plurality of MOS values generated by the MOS value calculating unit, with each other, and detecting a cause of sound quality deterioration.

16 Claims, 8 Drawing Sheets

APPARATUS AND METHOD FOR MEASURING QUALITY OF SOUND ENCODED WITH A VARIABLE BAND MULTI-CODEC

CROSS-REFERENCE TO RELATED PATENT APPLICATION

This application claims the benefit of Korean Patent Application No. 10-2006-0104789, filed on Oct. 27, 2006, in the Korean Intellectual Property Office, the disclosure of which is incorporated herein in its entirety by reference.

BACKGROUND OF THE INVENTION

1. Field of the Invention

The present invention relates to an apparatus and method for measuring quality of sound encoded with a variable band multi-codec, and more particularly, to an apparatus and method for measuring quality of sound encoded with a variable band multi-codec, and determining the cause of sound quality deterioration when sound quality deteriorates, when a packet network provides multimedia services in real time in connection with an existing wired/wireless network.

This work was supported by the IT R&D program of MIC/IITA [2005-S-100-02, Development of Multi-codec and Its Control Technology Providing Variable bandwidth Scalability].

2. Description of the Related Art

In general, variable band multi-codecs are used to convert a natural sound into digital data having a variety of transmission rates.

For example, when a natural sound is encoded, frequency bands are divided into a narrow band (from 300 Hz to 3,400 Hz), a wide band (from 50 Hz to 7,000 Hz), and an audio band (from 20 Hz to 20,000 Hz), wherein each band can provide a transmission rate of 8, 12, 14, 16, 18, 20, 22, 24, 26, 28, 30 or 32 kbps. In a Voice over Internet Protocol (VoIP) telephone service through a packet network, it is assumed that bands provided through the packet network are variable and cannot be estimated. For above example, in the VoIP telephony service, a variable band multi-codec obtains the best sound quality at a transmission rate of 32 kbps, and obtains the worst sound quality at a transmission rate of 8 kps.

If packets can be transmitted with high sound quality due to the margin of the network band, packets will be transmitted at a transmission rate of 32 kbps. If the network environment becomes poor due to a change in the network band, packets will be transmitted at a transmission rate of 30 kbps. If the network environment becomes worse, packets will be transmitted at a transmission rate of 28 kbps, and if the network environment becomes further worse than the above case, packets will be transmitted at a transmission rate of 26 kbps. As such, in the variable band multi-codec, since a transmission rate depends on a network environment, sound quality can deteriorate. But data loss, delay, etc. will be reduced, because less problem is generated in data transmission over the network, That is, in the variable band multi-codec, if the transmission rate is high, high sound quality is achieved but network transfer loss or delay increases, and if the transmission rate is low, sound quality deteriorates but the possibility of network transfer loss or delay being generated decreases.

In order to apply such a variable band multi-codec, a signal protocol transform technique for call set-up is used. The signal protocol transform technique is disclosed in RFC (Request for Comments) 3261 "SIP", RFC 3264 "Offer/Answer SDP", RFC 2833 "RTP Payload for DTMF Digits, Telephony Tones and Telephony Signals", RFC 2327 "SDP", RFC 3108 "ATM SDP", RFC 1890 "RTP Profile Payload type", etc., issued by the Internet Engineering Task Force (IETF).

Meanwhile, in order to enhance Quality of Service (QoS) with respect to sound quality in the variable band multi-codec, it is necessary to control a transmission rate with respect to a required sound quality. That is, in the variable band multi-codec, sound quality must be measured in an end-to-end way so that data can be transmitted at a correct transmission rate.

A conventional end-to-end sound quality measurement method is described below.

Korean Laid-open Patent Application No. 2003-0019839 entitled "Detecting Device for Quality of Conversation in Mobile Communication System and Method Therefor", which was laid-open on Mar. 7, 2003, discloses an apparatus for measuring sound quality in real time in a mobile communication system.

Also, Korean Laid-open Patent Application No. 2000-0025237 entitled "Method of Automatically Measuring Quality of Vocoder of CDMA System", which was laid-open on May 6, 2000, discloses an apparatus for automatically measuring the quality of a vocoder installed in a control station of a CDMA system.

Also, U.S. Pat. No. 7,002,992 entitled "Codec Selection to Improve Media Communication", which was published on Feb. 21, 2006, discloses an apparatus for selecting a codec according to network parameters.

Also, U.S. Pat. No. 5,657,420 entitled "Variable Rate Vocoder", which was published on Aug. 12, 1997, discloses a codec standard for a vocoder having a variety of transmission rates, developed by Qualcomm Corporation.

However, the above-mentioned conventional techniques cannot recognize differences between objects that are to be subjected to end-to-end sound quality measurement, and cannot determine the cause of sound quality distortion. Accordingly, a method and apparatus for measuring quality of sound encoded with a variable band multi-codec in real time are need. And a method and apparatus for determining the cause of sound quality distortion are needed.

SUMMARY OF THE INVENTION

The present invention provides an apparatus and method for measuring sound quality in real time and determining the cause of sound quality deterioration when sound quality deteriorates, in order to detect sound quality deterioration of a natural original sound when a variable band multi-codec is used in a multimedia service, such as Voice over Internet Protocol (VoIP), etc.

The present invention also provides an apparatus and method for storing a sound signal in a variety of formats and transmitting the sound signal over a variety of paths to a sound quality measuring apparatus, in order to measure quality of sound encoded with a variable band multi-codec.

According to an aspect of the present invention, there is provided an apparatus for measuring quality of sound encoded with a variable band multi-codec, including: a recording file receiving/generating unit receiving a first recording file in which a natural sound is recorded, and a second recording file obtained by converting the natural sound into digital data using the variable band multi-codec, receiving information obtained by encoding the natural sound using the variable band multi-codec, in the format of a Real Time Protocol (RTP) packet, unpacking the RTP packet, decoding the RTP packet using the variable band multi-codec, and generating a third recording file; a Mean Opinion Score (MOS) value calculating unit repeatedly selecting a file from among the first recording file, the second recording file, and the third recording file, or selecting two files from among the first recording file, the second recording file, and the third recording file, and calculating a MOS value by obtaining a difference between the selected results; and a MOS value comparison unit comparing a plurality of MOS values generated by the MOS value calculating unit, with each other, and detecting a cause of sound quality deterioration.

In the first recording file and the second recording file, a recording start time and a recording termination time are set on the basis of a start RTP sequence number and a end RTP sequence number.

The recording file receiving/generating unit receives the first recording file and the second recording file through a network in which no data loss occurs.

The apparatus further includes a sound quality measurement parameter extracting unit extracting a plurality of sound quality measurement parameters used to evaluate sound quality, on the basis of a received start RTP sequence number and a received end RTP sequence number.

According to another aspect of the present invention, there is provided an apparatus for transmitting a sound signal encoded with a variable band multi-codec to a sound quality measuring apparatus, the apparatus including: a recording unit generating natural sound and generating a first recording file; an encoder encoding the first recording file into digital data, using the variable band multi-codec; an RTP packaging unit packaging the digital data according to a Real Time Protocol (RTP) standard, and generating an RTP packet; a first transmitting unit transmitting the first recording file and the digital data through a network in which no data loss occurs; and a second transmitting unit transmitting the RTP packet generated by the RTP packaging unit.

A second recording file including the digital data is generated, and in the first recording file and the second recording file, a recording start time and a recording termination time are set on the basis of a start RTP sequence number and a end RTP sequence number, respectively.

According to another aspect of the present invention, there is provided a method of measuring quality of sound encoded with a variable band multi-codec, including: (a) receiving a first recording file in which a natural sound is recorded, and a second recording file obtained by converting the natural sound to digital data using the variable band multi-codec; (b) receiving information obtained by encoding the natural sound using the variable band multi-codec, in the format of a Real Time Protocol (RTP) packet, unpacking the RTP packet, decoding the RTP packet using the variable band multi-codec, and generating a third recording file; (c) selecting a file repeatedly from among the first recording file, the second recording file, and the third recording file, or selecting two files from among the first recording file, the second recording file, and the third recording file, and calculating a Mean Opinion Score (MOS) value by obtaining a difference between the selected results; and (d) comparing a plurality of MOS values generated in operation (c) with each other, and detecting a cause of sound quality deterioration.

According to another aspect of the present invention, there is provided a method for transmitting a sound signal encoded with a variable band multi-codec to a sound quality measuring apparatus, the method including: (a) recording a natural sound and generating a first recording file; (b) encoding the first recording file into digital data, using the variable band multi-codec; (c) packaging the digital data according to a Real Time Protocol (RTP) standard, and generating an RTP packet; (d) transmitting the first recording file and the digital data to the sound quality measurement apparatus, through a network in which no data loss occurs; (e) transmitting the RTP packet generated in operation (c) to the sound quality measurement apparatus, according to an RTP transmission standard.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings.

In the following description, it is assumed that signal processing between a transmitter side and a receiver side is based on the Internet Engineering Task Force (IETF) standard. Accordingly, a detailed description related to a call flow from the receiver side to the transmitter side will be omitted in consideration of the IETF standard.

Figure 1:
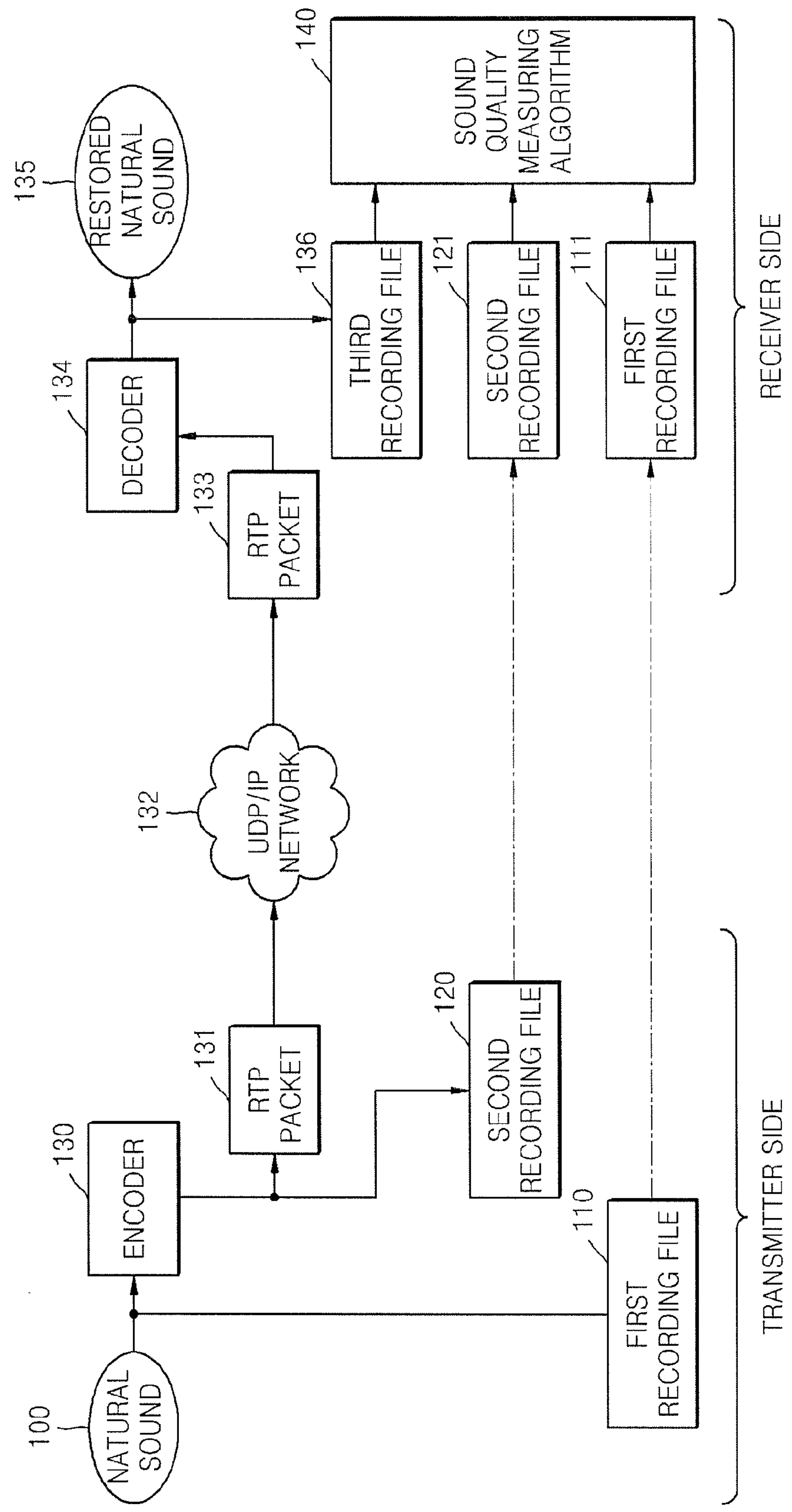
FIG. 1 is a view for explaining data transmission by an end-to-end sound quality measuring method according to an embodiment of the present invention.

FIG. 1 is a view for explaining data transmission by an end-to-end sound quality measuring method according to an embodiment of the present invention.

Referring to FIG. 1, the end-to-end sound quality measuring method is a method for data transmission between a transmitter side and a receiver side. The transmitter side records and stores a natural sound 100 and then transmits the natural sound 100 to a sound quality measuring apparatus of the receiver side. The receiver side receives files from the transmitter side, measures sound quality of the files, and analyzes the cause of sound quality deterioration when sound quality deteriorates.

In general, when a real-time voice service such as a Voice over Internet Protocol (VoIP) is provided, the transmitter side records a natural sound 100, converts the natural sound 100 into digital data in an encoder 130, packages the digital data to an RTP packet 131 according to the Real Time Protocol (RTP) standard, and then transmits the RTP packet 131 to the receiver side through a network 132. The receiver side receives an RTP packet 133 corresponding to the RTP packet 131, unpacks the RTP packet 133 in a decoder 134 to create a restored natural sound 135, and provides the restored natural sound 135 to a user. Here, the natural sound 100 may be a human's voice or so, and the restored natural sound 135 may be an audible sound converted by the above-described process.

Here, the network 132 may be a protocol or a network which can transmit the RTP packet 131. The network 132 includes a UDP/IP network, however, is not limited to the UDP/IP network. That is, the network 132 may be an arbitrary network in which packet loss can occur according to the network's status.

In the current embodiment, sound quality is measured not only by using a third recording file 136 restored by the decoder 134, but also by using first recording files 111 and second recording files 121. Accordingly, it is possible to correctly measure sound quality and find out the cause of sound quality deterioration when sound quality deteriorates, so as to cope effectively with the sound quality deterioration.

The first recording file 110 of the transmitter side is a file in which the natural sound 100 is recorded as it is, and the first recording file 111 of the receiver side is a file corresponding to the first recording file 110, which is transmitted through the network 132 without any transformation and stored in the receiver side. The first recording file 110 of the transmitter side and the first recording file 111 of the receiver side include the same content even though they are stored in different locations.

The second recording file 120 of the transmitter side is a file storing digital data into which the natural sound 100 is converted by the encoder 130. Also, the second recording file 121 of the receiver side is a file corresponding to the second recording file 120, which is transmitted through the network 132 without any transformation and stored in the receiver side. The second recording file 120 of the transmitter side and the second recording file 121 of the receiver side include the same content even though they are stored in different locations.

As described above, the third recording file 136 is a file corresponding to the natural sound 100, which is processed by the encoder 130, the UDP/IP network 132, and the decoder 134 and then stored in the receiver side.

The first recording file 110 and the second recording file 120 of the transmitter side are not transmitted according to the RTP method, which is different from the third recording file 136. The reason for this is described below.

Since the RTP method is based on the User Datagram Protocol (UDP) method, packet loss can occur according to the traffic status of an IP network. If packet loss occurs, packets are transmitted to the receiver side using a different method (for example, a Transmission Control Protocol/File Transfer Protocol (TCP/FTP)) since sound quality deteriorates in the receiver side. According to the TCP/FTP, a series of successive data (a series of sound packet data from a start packet to an end packet) is not lost regardless of the network's traffic status. Accordingly, by comparing a series of data transmitted by the RTP method in which packet loss can occur with a series of data transmitted by the TCP/FTP in which no packet loss occurs, it is possible to objectively and correctly determine whether sound quality deteriorates.

The sound quality measuring apparatus of the receiver side compares the first through third recording files 111, 121, and 136 with each other, according to a sound quality measurement algorithm 140, thereby measuring sound quality. The sound quality measurement algorithm 140 will be described in more detail later with reference to FIG. 3.

Figure 2:
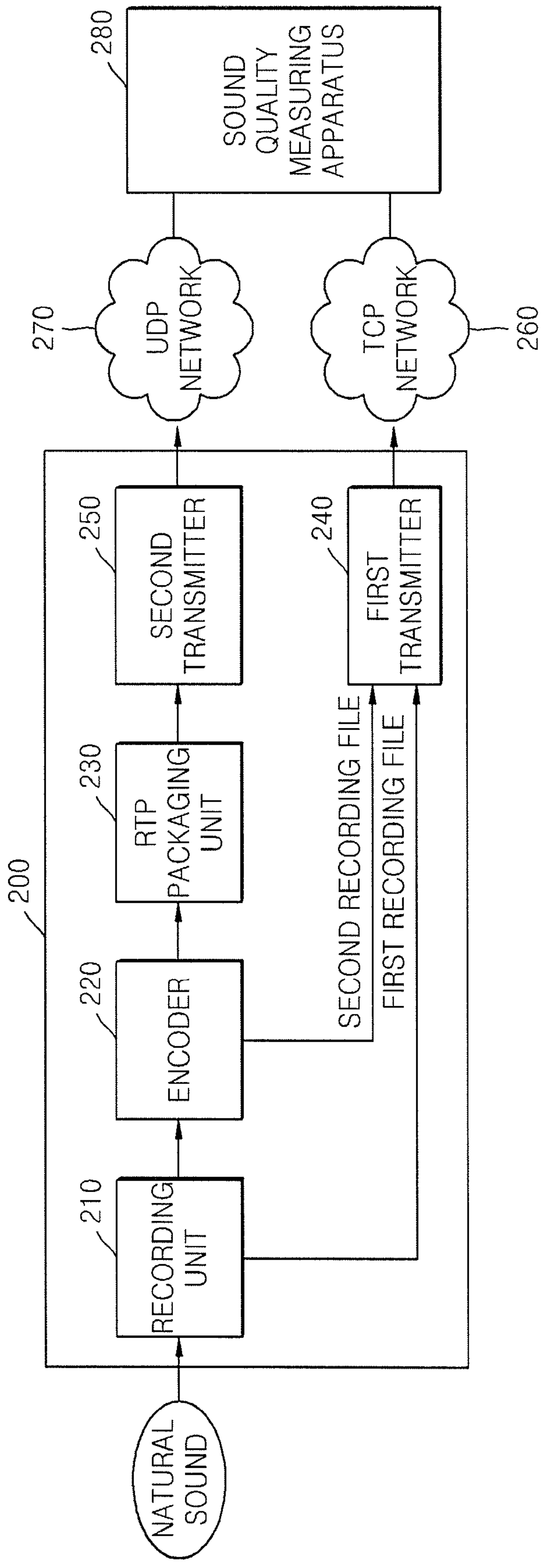
FIG. 2 is a block diagram of a sound signal transmitting apparatus for measuring quality of sound encoded with a variable band multi-codec, according to an embodiment of the present invention.

FIG. 2 is a block diagram of a sound signal transmitting apparatus 200 for measuring quality of sound encoded with a variable band multi-codec, according to an embodiment of the present invention.

Referring to FIG. 2, the sound signal transmitting apparatus 200, which transmits sound signals to a sound quality measuring, includes a recording unit 210, an encoder 220, an RTP packaging unit 230, a first transmitter 240, and a second transmitter 250.

The recording unit 210 receives a natural sound and generates a first recording file. The first recording file is transferred to a sound quality measuring apparatus 280 of a receiver side through the first transmission unit 240. Here, the first recording file is transmitted to the receiver side through a network 260 in which no data loss occurs, for example, through a network in which a TCP protocol is used.

The recording start times of the first and second recording files may be set to a start RTP sequence number of the corresponding RTP packet, and the recording termination times of the first and second recording files may be set to a end RTP sequence number of the corresponding RTP packet. Accordingly, since the recording of the first through third recording files starts and ends at the same time, comparing recording files each other for sound quality measurement can be accomplished accurately.

The encoder 220 encodes the first recording file into digital data using a codec. The encoded digital data is stored as a second recording file in the sound signal transmitting apparatus 200, and then transferred to a sound quality measuring apparatus 280 of a receiver side via the first transmitter 240. Like the first recording file, the second recording file is transmitted to the sound quality measuring apparatus 280 of the receiver side via the first transmitter 240, through the network 260 in which no data loss occurs.

The RTP packaging unit 230 packages the digital data according to the RTP standard, and generates an RTP packet.

The RTP packet is transmitted to the sound quality measuring apparatus 280 of the receiver side via the second transmitter 250. The RTP packet is transmitted through a network 270 in which data loss can occur, for example, through an arbitrary network in which a UDP protocol is used.

In FIG. 2, the network 260 in which no data loss occurs is illustrated separately from the network 270 in which data loss can occur, in order to indicate that the networks 260 and 270 use different protocols. However, this does not mean that data must be transmitted through physically different networks.

Figure 3:
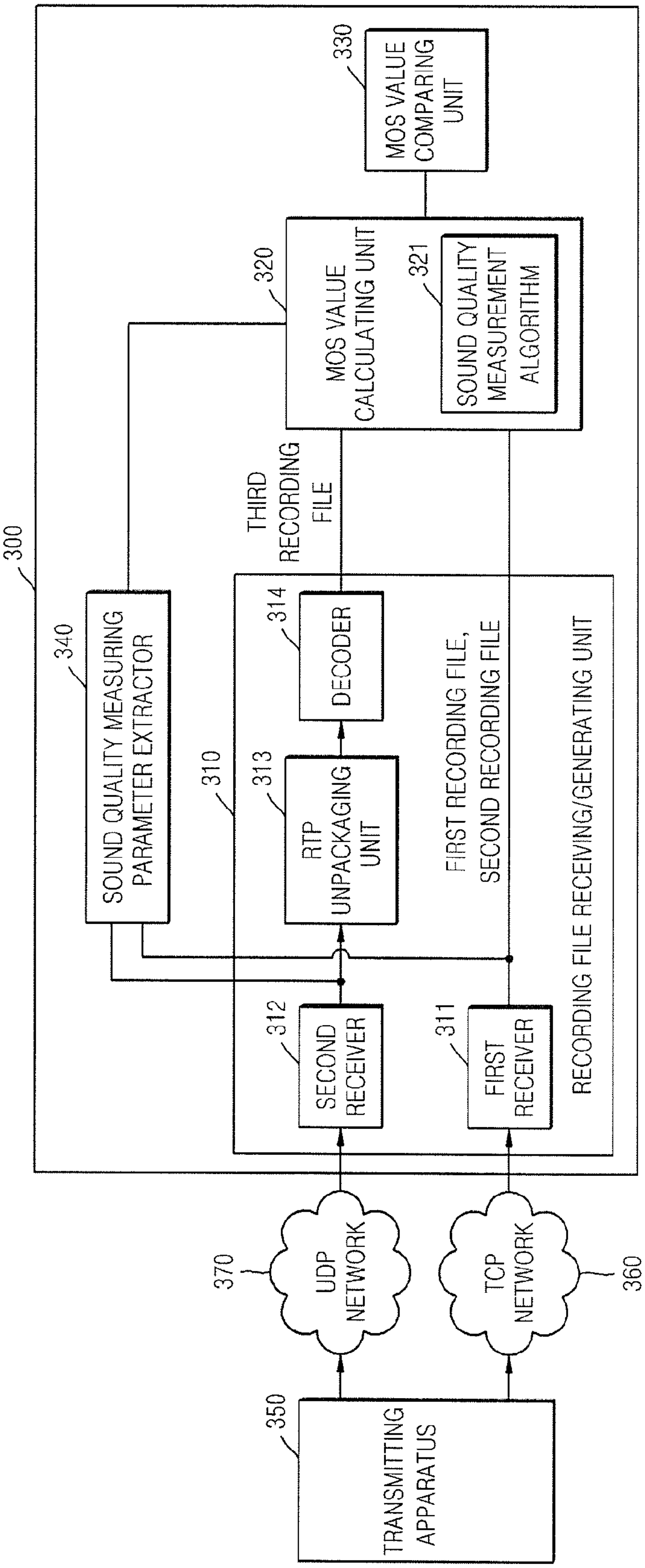
FIG. 3 is a block diagram of an apparatus for measuring quality of sound encoded with a variable band multi-codec, according to an embodiment of the present invention.

FIG. 3 is a block diagram of an apparatus for measuring quality of sound encoded with a variable band multi-codec, according to an embodiment of the present invention.

Referring to FIG. 3, the sound quality measuring apparatus 300 includes a recording file receiving/generating unit 310, a Mean Opinion Score (MOS) value calculating unit 320, and a MOS value comparing unit 330.

In more detail, the recording file receiving/generating unit 310 includes a first receiver 311, a second receiver 312, an RTP unpacking unit 313, and a decoder 314.

The first receiver 311 receives a first recording file and a second recording file transmitted by a transmitting apparatus 350 of a transmitter side, through a network 360 in which no data loss occurs, in order to measure sound quality.

As described above with reference to FIG. 2, the first recording file is created by recording natural sound, and the second recording file is created by converting the natural sound to digital data using a codec.

The second receiver 312 receives an RTP packet transmitted by the transmitting apparatus 350, through a network 370 in which data loss can occur. As described above with reference to FIG. 2, the RTP packet is obtained by encoding natural sound using a codec according to the RTP standard and packaging the encoded result in the transmission apparatus 350.

The recording file receiving/generating unit 310 unpacks the RTP packet through the RTP unpacking unit 313, obtains digital data, decodes the digital data through a decoder 314, and generates a third recording file.

The recording start times of the first and second recording files may be set to a start RTP sequence number of the corresponding RTP packet, and the recording termination times of the first and second recording files may be set to a end RTP sequence number of the corresponding RTP packet. Accordingly, since the recording of the first through third recording files starts and ends at the same time, comparing recording files each other for sound quality measurement can be accomplished accurately.

The MOS value calculator 320 repeatedly selects a file or selects two files from among the first through third recording files, and calculates a MOS value by obtaining a difference between the selected files.

MOS is a method of evaluating sound quality using five levels. According to the MOS, the best sound quality is set to 5 and the worst sound quality is set to 1. The International Telegraph and Telephone Consultative Committee (CCITT) prepares a MOS-based evaluation level recommendation proposal.

The MOS value calculator 320 calculates the MOS value using a sound quality measurement algorithm 321. Conventional sound quality measurement algorithm can be used for the sound quality measurement algorithm 321.

In detail, the MOS value calculator 320 calculates a first MOS value on the basis of the first and second recording files, calculates a second MOS value on the basis of the first and third recording files, calculates a third MOS value on the basis of the second and third recording files, and calculates a fourth MOS value on the basis of only the first recording file.

The MOS value comparing unit 330 compares the first through fourth MOS values generated by the MOS value calculator 320 with each other, and if sound quality deteriorates, it detects the cause of sound quality deterioration.

The MOS value comparing unit 330 determines that the cause of sound quality deterioration is the codec if the first MOS value is smaller than the fourth MOS value. Also, if the second MOS value is smaller than the third MOS value, the MOS value comparing unit 330 determines that the cause of sound quality deterioration is the network or the system's status.

The sound quality measuring apparatus 300 can further include a sound quality measurement parameter extractor 340 which extracts sound quality measurement parameters used to evaluate sound quality on the basis of received start RTP sequence number and end RTP sequence number.

Here, the sound quality measurement parameters may include a packet loss accumulation number, a packet successive loss accumulation number, a packet delay time, and a CPU occupancy ratio. As the packet loss accumulation number, the packet successive loss accumulation number, the packet delay time, and the CPU occupancy ratio increase, the first through fourth MOS values decrease. A method of extracting sound quality measurement parameters will be described in detail later with reference to FIG. 7.

Figure 4:
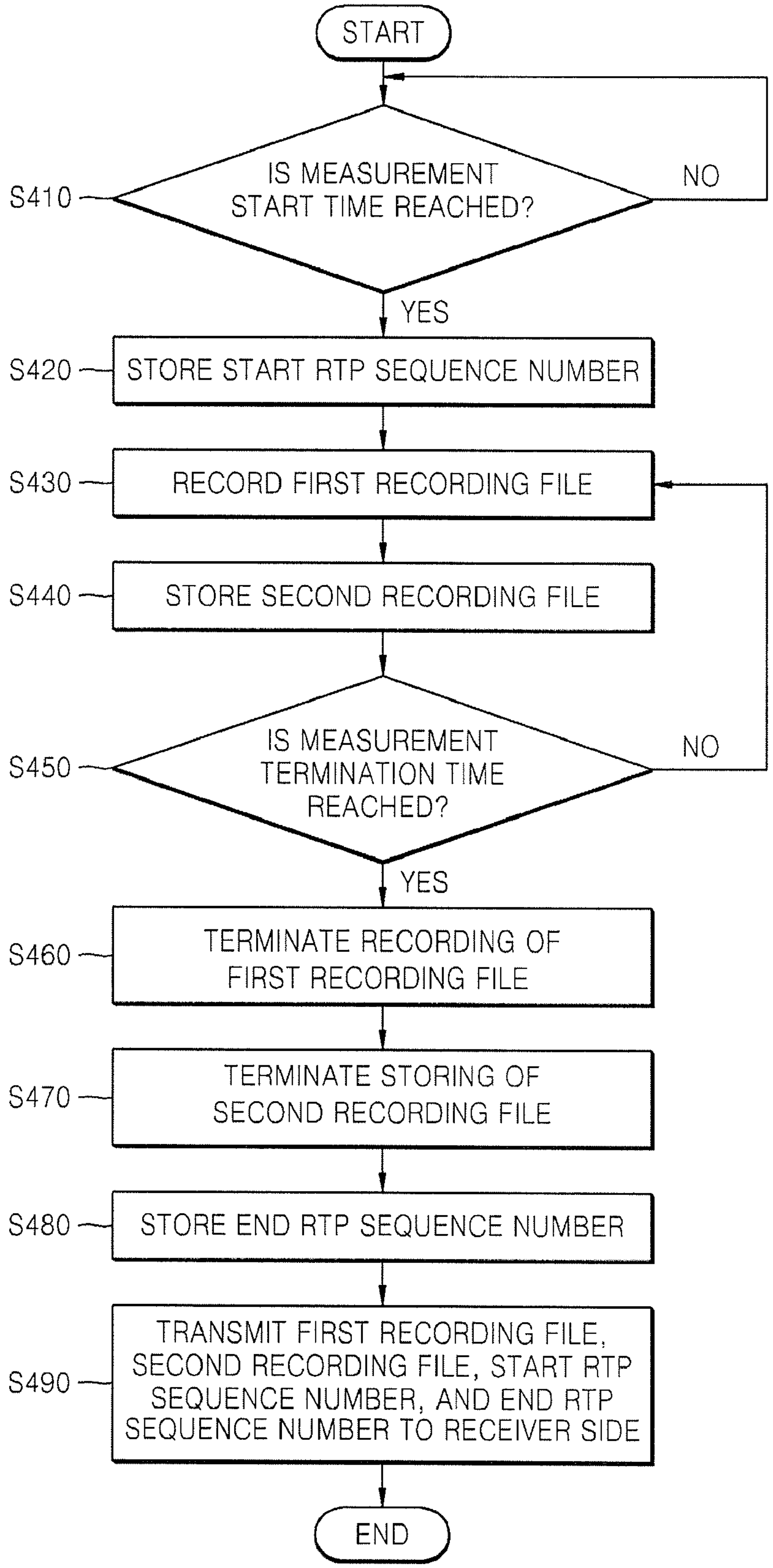
FIG. 4 is a flowchart of a method for generating a first recording file and a second recording file, according to an embodiment of the present invention.

FIG. 4 is a flowchart of a method for generating the first and second recording files, according to an embodiment of the present invention.

As described above, the transmitting apparatus can record the first and second recording files after setting the recording start times of the first and second recording files to a start RTP sequence number of the corresponding RTP packet and setting the recording termination times of the first and second recording files to a end RTP sequence number of the RTP packet.

The method of recording the first and second recording files will be described below.

Referring to FIG. 4, if a natural sound is received, it is determined whether a measurement start time is reached (operation S410). If the measurement start time is reached, a start RTP sequence number is stored (operation S420). Then, a first recording file is recorded (operation S430) and a second recording file is stored (operation S440).

Then, it is determined whether a measurement termination time is reached (operation S450). If the measurement termination time is not reached, the recording of the first recording file and the storing of the second recording file are continuously performed.

If the measurement termination time is reached, the recording of the first recording file and the storing of the second recording file are terminated (operations 460 and S470). Then, a end RTP sequence number is stored (operation S480).

Finally, the stored first recording file, the stored second recording file, the stored start RTP sequence number, and the stored end RTP sequence number are transmitted from the transmitter side to the receiver side (operation S490).

In conventional techniques, when two files are compared with each other, a comparison start time and a comparison termination time are not correctly set. Accordingly, when a sound quality measurement algorithm is applied, it is difficult to obtain an accurate result.

In order to resolve such a problem, according to the present invention, a recording start time and a recording termination time are set on the basis of RTP sequence number. Accordingly, when MOS values are calculated using a sound quality measurement algorithm, an accurate result can be obtained.

Figure 5:
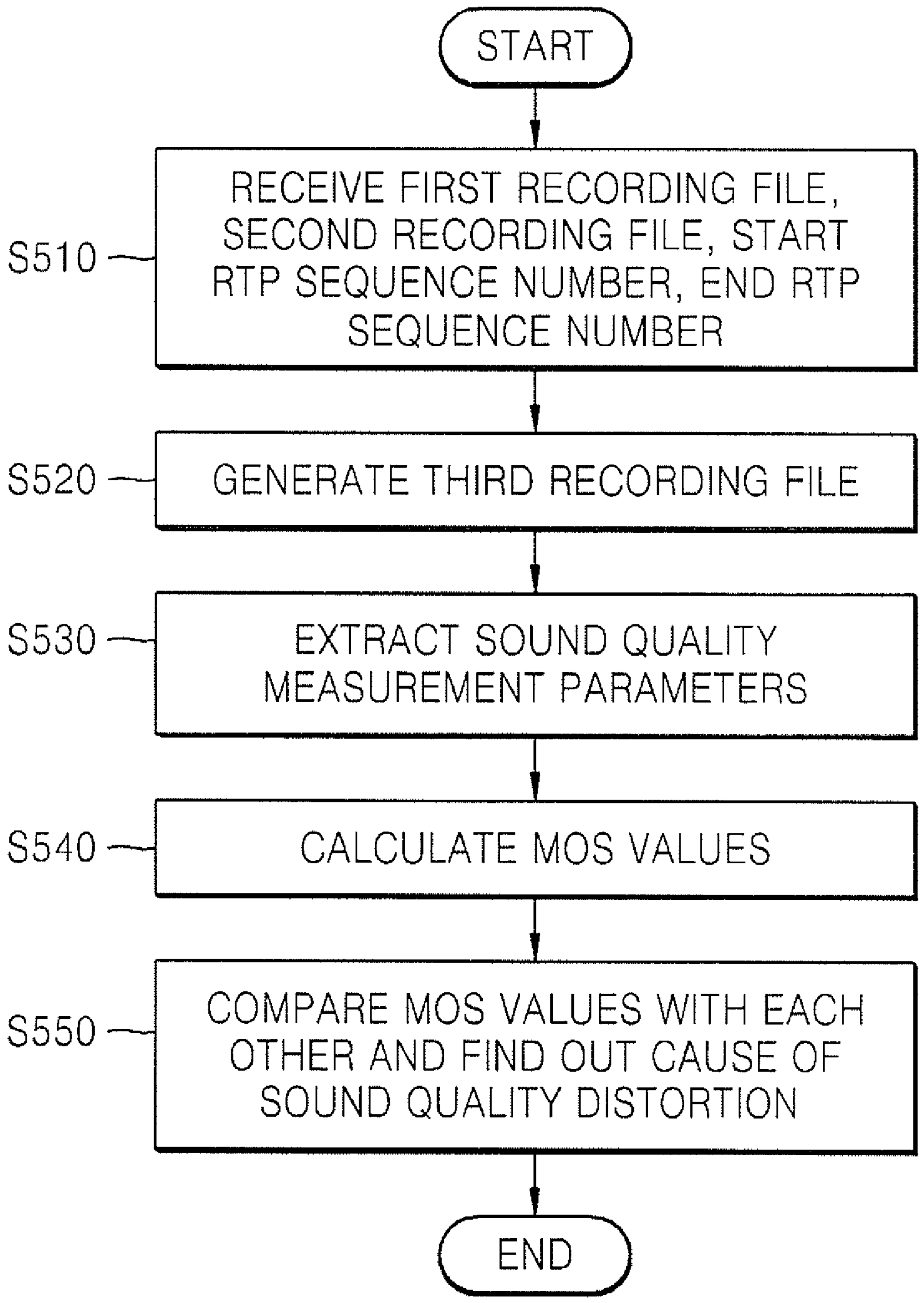
FIG. 5 is a flowchart of a sound quality measuring method for a variable band multi-codec, according to an embodiment of the present invention.

FIG. 5 is a flowchart of a sound quality measuring method for a variable band multi-codec, according to an embodiment of the present invention. The sound quality measuring method will be described in detail with reference to FIGS. 3 and 5, below.

Referring to FIGS. 3 and 5, the first receiver 311 receives a first recording file in which a natural sound is recorded, and a second recording file obtained by converting the natural sound to digital data using a codec (operation S510).

Then, the second receiver 312 receives information obtained by encoding the natural sound using the codec, in the format of an RTP packet, then unpacks the RTP packet, decodes the result of the unpacking using the same codec, and generates a third recording file (operation S520). A method of recording the third recording file will be described in more detail later with reference to FIG. 6.

The sound quality measuring method can further include extracting sound quality measurement parameters used to evaluate sound quality on the basis of received start RTP sequence number and end RTP sequence number (operation S530). Operation S530 is performed by the sound quality measurement parameter extractor 340.

The sound quality measurement parameters can include a packet loss accumulation number, a packet successive loss accumulation number, a packet delay time, and a CUP occupancy ratio.

Then, the MOS value calculator 320 repeatedly selects a file or selects two files from among the first through third recording files, and calculates a MOS value by obtaining a difference between the selected files (operation S540).

Finally, the MOS value comparison unit 330 compares a plurality of MOS values generated by the MOS value calculator 320 with each other, and detects the cause of sound quality deterioration if sound quality deteriorates (operation S550).

Here, operations S510 through S530 may be concurrently performed.

Figure 6:
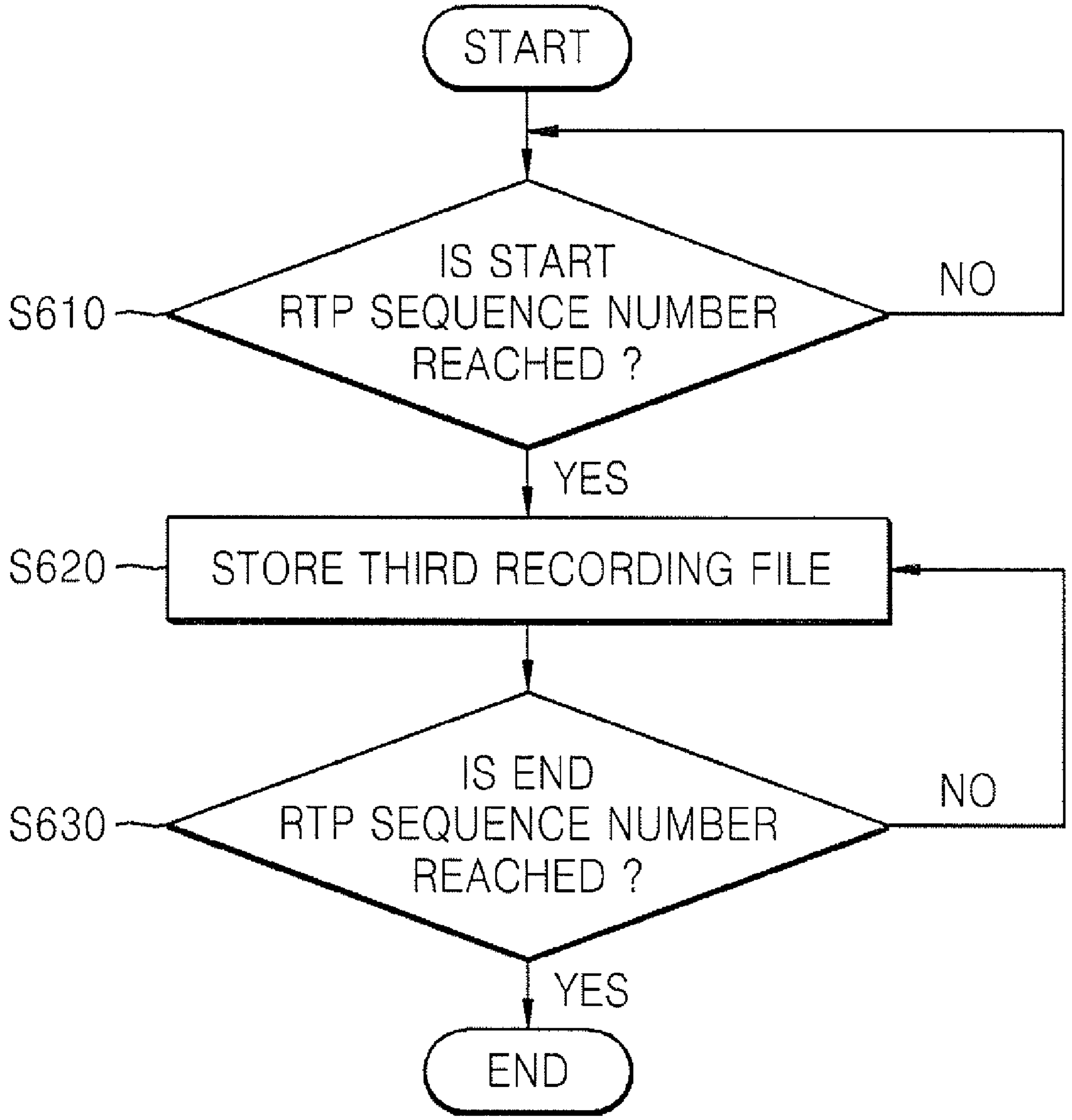
FIG. 6 is a detailed flowchart of operation S520 illustrated in FIG. 5.

FIG. 6 is a flowchart of operation S520 illustrated in FIG. 5.

Referring to FIG. 6, if the receiver side begins to receive an RTP packet, it is determined whether the RTP packet corresponds to a start RTP sequence number (operation S610). If the RTP packet corresponds to the start RTP sequence number, a third recording file is stored (operation S620). The third recording file is continuously stored until an end RTP sequence number is found (operation S630). If the end RTP sequence number is found, the storing of the third recording file is terminated.

Figure 7:
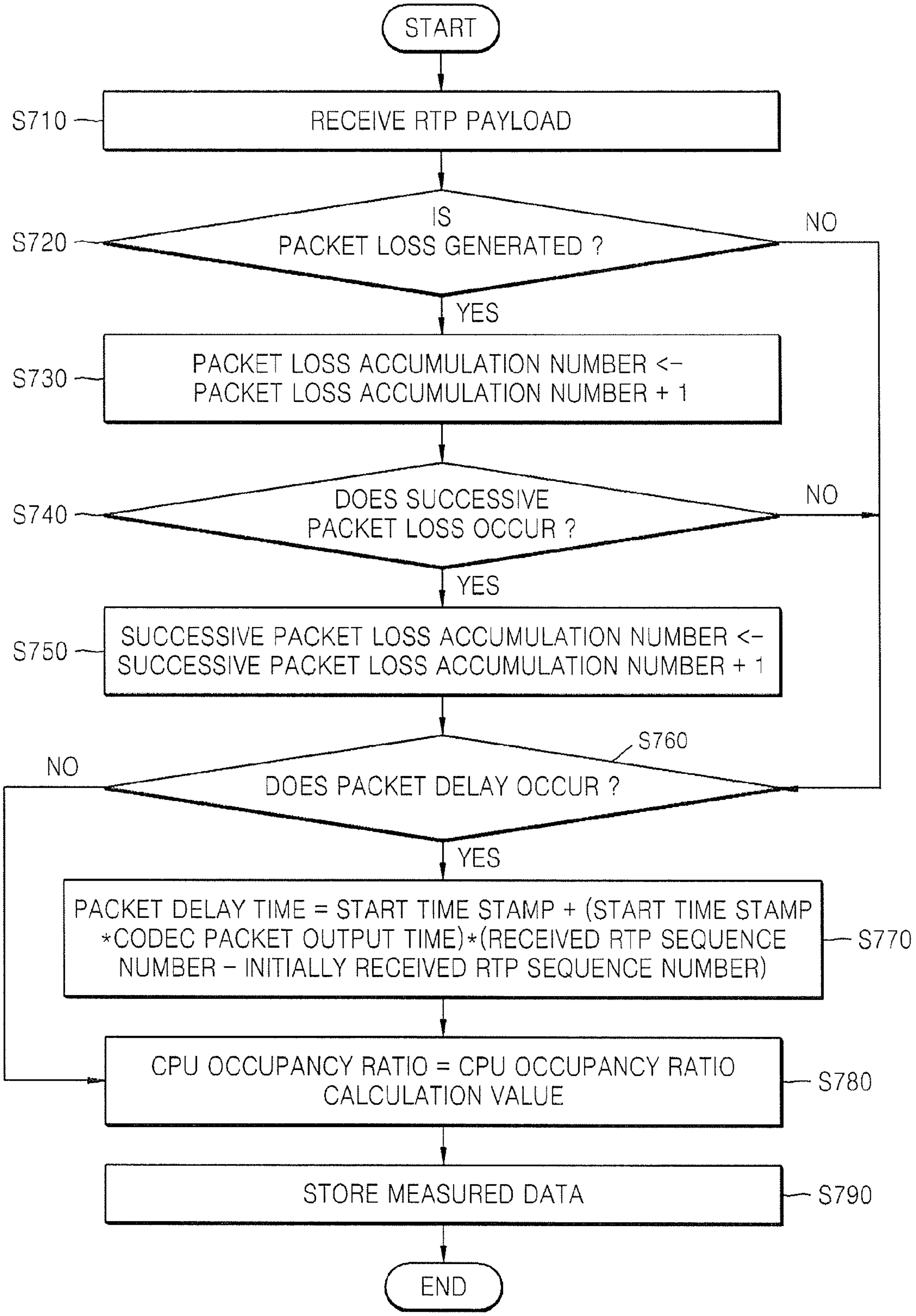
FIG. 7 is a detailed flowchart of operation S530 illustrated in FIG. 5.

FIG. 7 is a detailed flowchart of operation S530 illustrated in FIG. 5.

Referring to FIG. 7, if a RTP payload is received (operation S710), it is determined whether packet loss occurs, on the basis of an RTP sequence number (operation S720).

If packet loss occurs, a packet loss accumulation number increases (operation S730). Then, it is determined whether the packet loss is successive packet loss (operation S740). If the packet loss is successive packet loss, a packet successive loss accumulation number increases (operation S750).

Then, if a packet delay occurs (operation S760), a packet delay time is calculated by the following equation (operation S770).

Packet Delay Time=Start Time Stamp+(Start Time Stamp*Codec Packet Output Time)*(Received RTP sequence number−Initially Received RTP sequence number)

Finally, a CPU occupancy ratio is calculated (operation S780), and sound quality measurement parameters are extracted and stored (operation S790).

Figure 8:
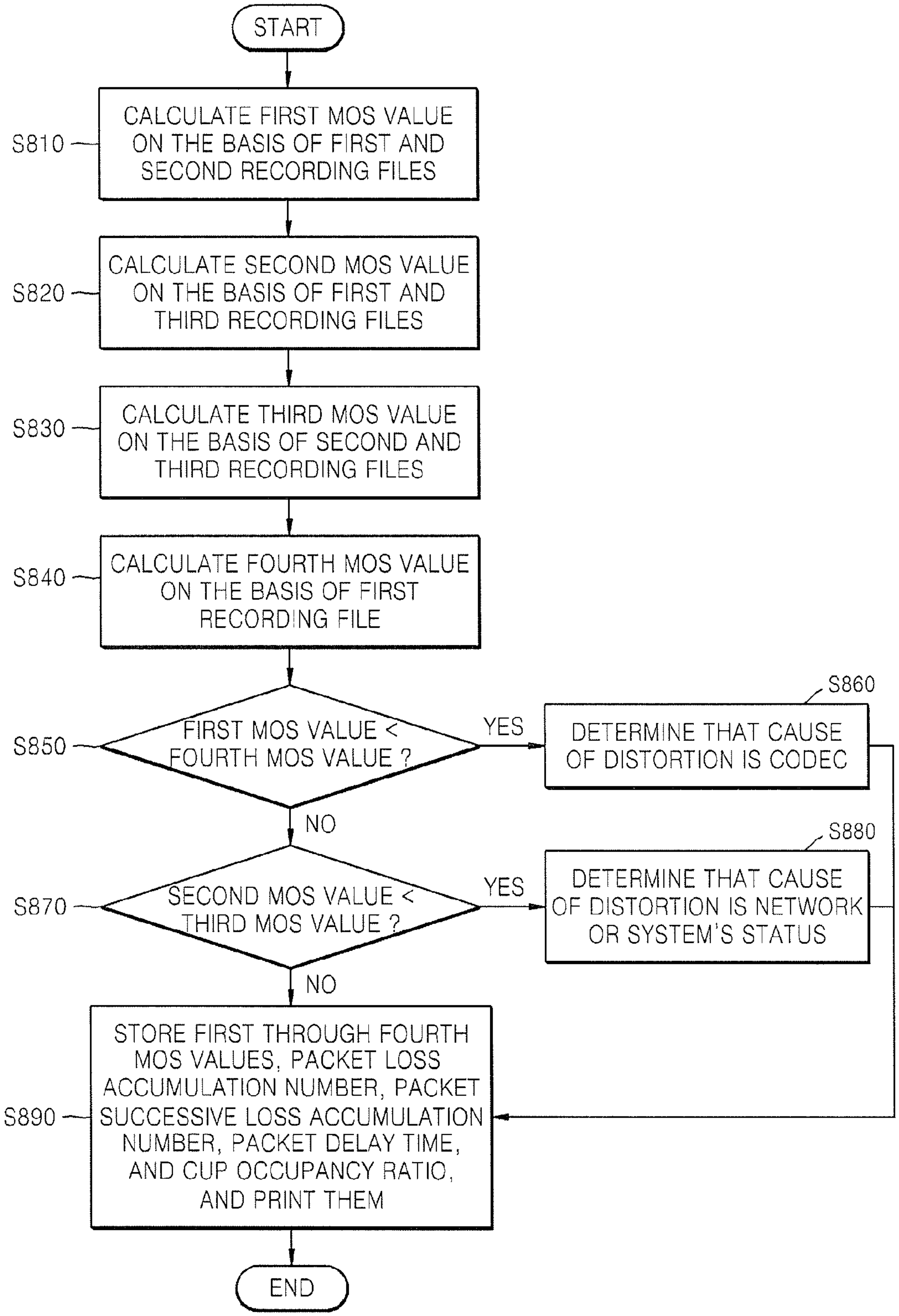
FIG. 8 is a detailed flowchart of operation S540 and operation S550 illustrated in FIG. 5.

FIG. 8 is a detailed flowchart of operation S540 and operation S550 illustrated in FIG. 5.

Referring to FIG. 8, the first recording file is compared with the second recording file, thus calculating a first MOS value (operation S810).

Then, the first recording file is compared with the third recording file, thus calculating a second MOS value according to the result of the comparison (operation S820), the second recording file is compared with the third recording file, thus calculating a third MOS value according to the result of the comparison (operation S830), and the first recording file is compared with itself, thus calculating a fourth MOS value according to the result of the comparison (operation S840).

Then, the first through fourth MOS values are compared with each other. In detail, if the first MOS value is smaller than the fourth MOS value (operation S850), it is determined that the cause of sound quality distortion is a codec (operation S860). If the second MOS value is smaller than the third MOS value (operation S870), it is determined that the cause of sound quality distortion is a network or a system's status (operation S880).

Finally, the first through fourth MOS values, the packet loss accumulation unit, the packet successive loss accumulation number, the packet delay time, and the CPU occupancy ratio are stored in a log file and printed (operation S890).

In conventional techniques, since two sound qualities that are to be measured are not distinctly defined, difficulty exists in interpreting the measurement results of sound qualities. However, according to the present invention as described above, the data characteristics of the first through third recording files are distinctly defined. Also, since the first through third recording files are compared with each other, a correct measurement is possible and the cause of sound quality distortion can be correctly determined.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, it is possible to correctly measure end-to-end sound quality of a variable band multi-codec, and easily find out the cause of sound quality deterioration such as natural sound distortion, etc., so as to cope effectively with the sound quality deterioration.

Also, according to the present invention, it is possible to store data whose sound quality will be measured, using a correct start point and a correct termination point, and calculate correct results when MOS values are obtained, using a sound quality measurement algorithm.

Also, according to the present invention, it is possible to provide real-time multi-media services with a high QoS which can be applied to high-quality Internet Telephony, a Voice over Internet Protocol (VoIP), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for measuring quality of sound encoded with a variable band multi-codec, comprising:

a recording file receiving/generating unit receiving a first recording file in which a natural sound is recorded, and a second recording file obtained by converting the natural sound into digital data using the variable band multi-codec, receiving information obtained by encoding the natural sound using the variable band multi-codec, in the format of a Real Time Protocol (RTP) packet, unpacking the RTP packet, decoding the RTP packet using the variable band multi-codec, and generating a third recording file;

a Mean Opinion Score (MOS) value calculating unit repeatedly selecting a file from among the first recording file, the second recording file, and the third recording file, or selecting two files from among the first recording file, the second recording file, and the third recording file, and calculating a MOS value by obtaining a difference between the selected results wherein the MOS value calculating unit calculates a first MOS value on the basis of the first recording file and the second recording file, calculates a second MOS value on the basis of the first recording file and the third recording file, calculates a third MOS value on the basis of the second recording file and the third recording file, and calculates a fourth MOS value on the basis of only the first recording file; and a MOS value comparison unit comparing a plurality of MOS values generated by the MOS value calculating unit, with each other, and detecting a cause of sound quality deterioration wherein the MOS value comparing unit determines that the cause of sound quality distortion is the variable band multi-codec if the first MOS value is smaller than the fourth MOS value, and determines that the cause of the sound quality distortion is the network or a system's status if the second MOS value is smaller than the third MOS value.

2. The apparatus of claim 1, wherein, in the first recording file and the second recording file, a recording start time and a recording termination time are set on the basis of a start RTP sequence number and a end RTP sequence number.

3. The apparatus of claim 1, wherein the recording file receiving/generating unit receives the first recording file and the second recording file through a network in which no data loss occurs.

4. The apparatus of claim 1, further comprising a sound quality measurement parameter extracting unit extracting a plurality of sound quality measurement parameters used to evaluate sound quality, on the basis of a received start RTP sequence number and a received end RTP sequence number.

5. The apparatus of claim 4, wherein the plurality of sound quality measurement parameters include a packet loss accumulation number, a packet successive loss accumulation number, a packet delay time, and a CPU occupancy ratio.

6. An apparatus for transmitting a sound signal encoded with a variable band multi-codec to a sound quality measuring apparatus, the apparatus comprising:

a transmitter side comprising:

a recording unit generating natural sound and generating a first recording file;

an encoder encoding the first recording file into digital data as a second recording file, using the variable band multi-codec;

an RTP packaging unit packaging the digital data according to a Real Time Protocol (RTP) standard, and generating an RTP packet;

a first transmitting unit transmitting the first recording file and the the second recording file, through a network in which no data loss occurs; and a second transmitting unit transmitting the RTP packet generated by the RTP packaging unit; and a receiver side comprising:

a recording file receiving/generating unit receiving the first recording file in which a natural sound is recorded, and the second recording file obtained using the variable band multi-codec, receiving information obtained by encoding the natural sound using the variable band multi-codec, in the format of the RTP packet, unpacking the RTP packet, decoding the RTP packet using the variable band multi-codec, and generating a third recording file;

a Mean Opinion Score (MOS) value calculating unit repeatedly selecting a file from among the first recording file, the second recording file, and the third recording file, or selecting two files from among the first recording file, the second recording file, and the third recording file, and calculating a MOS value by obtaining a difference between the selected results wherein the MOS value calculating unit calculates a first MOS value on the basis of the first recording file and the second recording file, calculates a second MOS value on the basis of the first recording file and the third recording file, calculates a third MOS value on the basis of the second recording file and the third recording file, and calculates a fourth MOS value on the basis of only the first recording file; and a MOS value comparison unit comparing a plurality of MOS values generated by the MOS value calculating unit, with each other, and detecting a cause of sound quality deterioration wherein the MOS value comparing unit determines that the cause of sound quality distortion is the variable band multi-codec if the first MOS value is smaller than the fourth MOS value, and determines that the cause of the sound quality distortion is the network or a system's status if the second MOS value is smaller than the third MOS value.

7. The apparatus of claim 6, wherein the second recording file comprises a recording start time and a recording termination time are set on the basis of a start RTP sequence number and a end RTP sequence number, respectively.

8. A method of measuring quality of sound encoded with a variable band multi-codec, comprising:

(a) receiving a first recording file in which a natural sound is recorded, and a second recording file obtained by converting the natural sound to digital data using the variable band multi-codec;

(b) receiving information obtained by encoding the natural sound using the variable band multi-codec, in the format of a Real Time Protocol (RTP) packet, unpacking the RTP packet, decoding the RTP packet using the variable band multi-codec, and generating a third recording file;

(c) selecting a file repeatedly from among the first recording file, the second recording file, and the third recording file, or selecting two files from among the first recording file, the second recording file, and the third recording file, and calculating a Mean Opinion Score (MOS) value by obtaining a difference between the selected results, wherein operation (c) comprises (c1) calculating a first MOS value on the basis of the first recording file and the second recording file;

(c2) calculating a second MOS value on the basis of the first recording file and the third recording file;

(c3) calculating a third MOS value on the basis of the second recording file and the third recording file; and (c4) calculating a fourth MOS value on the basis of only the first recording file; and (d) comparing a plurality of MOS values generated in operation (c) with each other, and detecting a cause of sound quality deterioration wherein operation (d) comprises (d1) if the first MOS value is smaller than the fourth MOS value, determining that a cause of sound quality distortion is the variable band multi-codec; and (d2) if the second MOS value is smaller than the third MOS value, determining that the cause of sound quality distortion is a network or a system's status.

9. The method of claim 8, wherein, in the first recording file and the second recording file, a recording start time and a recording termination time are set on the basis of a start RTP sequence number and a end RTP sequence number, respectively.

10. The method of claim 8, wherein, in operation (a), the first recording file and the second recording file are received through a network in which no data loss occurs.

11. The method of claim 8, wherein operation (b) further comprises:

(b1) extracting a plurality of sound quality measurement parameters used to evaluate sound quality, on the basis of a received start RTP sequence number and a received end RTP sequence number.

12. The method of claim 11, wherein the plurality of sound quality measurement parameters include a packet loss accumulation number, a packet successive loss accumulation number, a packet delay time, and a CPU occupancy ratio.

13. The method of claim 12, wherein operation (b1) comprises:

(b1-1) receiving a payload of a Real Time Protocol (RTP) packet;

(b1-2) determining whether packet loss occurs, according to an RTP sequence number of the payload, and increasing the packet loss accumulation number if packet loss occurs;

(b1-3) if successive packet loss occurs, increasing the packet successive loss accumulation number;

(b1-4) if the RTP packet is delayed, calculating the packet delay time on the basis of a time stamp of the payload; and (b1-5) recording the CPU occupancy ratio when operations (b1-1) through (b1-4) are performed.

14. A method for transmitting and receiving Voice over Internet Protocol (VoIP), the method comprising:

(a) recording a natural sound and generating a first recording file at a transmitter side;

(b) encoding the first recording file into a second recording file as digital data, using the variable band multi-codec at the transmitter side;

(c) packaging the second recording file according to a Real Time Protocol (RTP) standard, and generating an RTP packet at the transmitter side;

(d) transmitting from the transmitter side the first recording file and the digital data to a receiver side comprising a sound quality measurement apparatus, through a network in which no data loss occurs;

(e) transmitting from the transmitter side the RTP packet generated in operation (c) to the sound quality measurement apparatus, according to an RTP transmission standard receiving at a receiving/generating unit the first recording file in which a natural sound is recorded, and the second recording file obtained using the variable band multi-codec, receiving information obtained by encoding the natural sound using the variable band multi-codec, in the format of the RTP packet, generating at the receiving/generating unit a third recording file by unpacking and decoding the RTP packet using the variable band multi-codec, and;

repeatedly selecting at a MOS value calculating unit of the receiving/generating unit a file from among the first recording file, the second recording file, and the third recording file, or selecting two files from among the first recording file, the second recording file, and the third recording file, to calculate a Mean Opinion Score (MOS) value by obtaining a difference between the selected results, wherein the MOS value calculating unit calculates a first MOS value on the basis of the first recording file and the second recording file, calculates a second MOS value on the basis of the first recording file and the third recording file, calculates a third MOS value on the basis of the second recording file and the third recording file, and calculates a fourth MOS value on the basis of only the first recording file; and comparing at the MOS value comparison unit a plurality of MOS values with each other, and detecting a cause of sound quality deterioration, wherein the MOS value comparing unit determines that the cause of sound quality distortion is the variable band multi-codec if the first MOS value is smaller than the fourth MOS value, and determines that the cause of the sound quality distortion is the network or a system's status if the second MOS value is smaller than the third MOS value.

15. The method of claim 14, wherein a second recording file storing the digital data is generated, and, in the first recording file and the second recording file, a recording start time and a recording termination time are set on the basis of a start RTP sequence number and a end RTP sequence number, respectively.

16. A non-transient computer-readable recording medium having embodied thereon a program for executing the method of any one of claims 8 through 13 and 14 through 15.

* * * * *